United States Patent
Shan (10) Patent No.: US 7,587,330 B1
(45) Date of Patent: Sep. 8, 2009

(54) METHOD AND SYSTEM FOR CONSTRUCTING PREDICTION INTERVAL BASED ON HISTORICAL FORECAST ERRORS

(75) Inventor: Jerry Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1316 days.

(21) Appl. No.: 10/355,353

(22) Filed: Jan. 31, 2003

(51) Int. Cl.
G06F 17/30 (2006.01)

(52) U.S. Cl. .................................................. 705/10
(58) Field of Classification Search .................... 705/10
See application file for complete search history.

(56) References Cited

U.S. PATENT DOCUMENTS

| | | | | |
|---|---|---|---|---|
| 5,953,707 | A * | 9/1999 | Huang et al. ................... | 705/10 |
| 6,839,682 | B1 * | 1/2005 | Blume et al. ................... | 705/10 |
| 6,847,976 | B1 * | 1/2005 | Peace .......................... | 707/102 |
| 7,212,978 | B2 * | 5/2007 | Kowal et al. .................... | 705/1 |

OTHER PUBLICATIONS

Pain "Coinegration and Forecast evaluation: Some lessons from National Institute forecasts", Sep. 1994, Journal of Forecast v13n5, Dialog file 15, Accession No. 00929374, pp. 481-494.*
Taylor et al (A Quantile Regression Approach to Generating Prediction Intervals), Feb. 1999, Management Services, pp. 225-237.*
Lee et al (Forecasting Error Evaluation In Material Requirements Planning (MPR) Production) Inventories Systems), Sep. 1986, Management Systems, vol. 32, No. 9, pp. 1-21.*
Ehrendorfer (Optimal Prediction of Forecast Error Covariances Through Singular Vector), Sep. 1995, Journal of The Atmospheric Sciences, pp. 1-28.*
Lee et al (Forecast Error Evaluation in Material Requirements Planning (MPR) Production Inventory), 9/2896, Management Science, vol. 32, pp. 1-21.*

* cited by examiner

*Primary Examiner*—Romain Jeanty (57) ABSTRACT

A method and system is used to construct a forecast error confidence interval. The predication interval provides a range of error for a current forecast value to any desired confidence level. The method and system involve running a forecast method on a set of historical data. For each historical period, a forecast is obtained at each time point in the period. The forecasts are compared to the target value of interest in each period. The comparison of target values to forecast values is used to build an error series for each historical period. The error values within each error series are pooled to form an error distribution series. The error distribution series can be used to provide a confidence interval for the current forecast.

42 Claims, 4 Drawing Sheets

METHOD AND SYSTEM FOR CONSTRUCTING PREDICTION INTERVAL BASED ON HISTORICAL FORECAST ERRORS

FIELD OF THE INVENTION

The present invention relates in general to prediction methods, and in particular prediction of revenue and other business data based on historical pattern identification and modeling.

BACKGROUND OF THE INVENTION

Businesses today are under intense pressure to compete in an environment of tight deadlines and reduced profits. One key to being successful in this environment is having timely and accurate financial and other business performance data that reflects the state of the corporation. It would be difficult for a modern large enterprise to be successful without accurate gathering and analysis of financial and other business performance data.

Businesses rely on financial data in order to support decision-making. The financial data is maintained in computerized financial reporting systems. For some large entities, these reporting systems process large numbers of complex transactions which occur at locations around the world. Businesses attempt to use this data to determine some behavior, such as predicted end-of-month and/or end-of quarter revenue, for supporting business decisions. However, modeling the complex financial transactions of the large enterprise is very difficult.

Traditionally, business enterprise data has been kept in databases that are sometimes specialized and often separate from other data repositories. Data may be stored in various incompatible databases and formats across corporate divisions. A major task in managing the large enterprise is effectively gathering this data into repositories for analysis within various levels of the organization.

Recently, businesses have started exploring the feasibility of applying traditional statistical analysis techniques to large databases for the purpose of discovering hidden data attributes, trends, and patterns. This exploration, known as data mining, has evolved into the creation of analytical tools based on a wide collection of statistical techniques.

For a corporation, the discovery of previously unknown statistical patterns or trends can provide valuable insight into the function and environment of the organization. Data-mining techniques allow businesses to predict future events, whereas analysis of warehoused data only gives evidence of past facts.

When using analytic methods for predictions of future events or behaviors, one factor is not always provided to decision-makers, the error of the forecast. No matter how good the forecast, a decision-maker may not be able to rely on the forecast without some way of rigorously determining the forecast error.

A system and method that address the aforementioned problems, as well as other related problems, are therefore desirable.

SUMMARY

To overcome limitations in the prior art described above, and to overcome other limitations that will become apparent upon reading and understanding the present specification, the present invention discloses a method and system for predicting a behavior value based on historical pattern identification and modeling.

In accordance with one embodiment of the invention, a computer-implemented method is used for determining a confidence interval for a forecasted behavior value. The method involves defining a plurality of historical periods each having a plurality of discrete time points. A target behavior value and a forecast series are generated for each historical period. The forecast series includes forecasts of the target behavior value at the discrete time points of the historical period.

A forecast error series is generated for each historical period as a function of the forecast series and the target behavior value of the historical period. An error distribution series is formed from pooled values of the forecast error series over the plurality of historical periods. A forecast error distribution is then generated from the error series at each of the time points in the properly normalized time period. Note that the lengths of the historical periods can be different. A normalization of the lengths can also be performed. The confidence interval can be determined as from the forecast error distribution.

The above summary of the present invention is not intended to describe each illustrated embodiment or implementation of the present invention. This is the purpose of the figures and the associated discussion that follows.

BRIEF DESCRIPTION OF THE DRAWINGS

The invention is described in connection with the embodiments illustrated in the following diagrams.

DETAILED DESCRIPTION

In the following description of an example embodiment, reference is made to the accompanying drawings that form a part hereof, and in which is shown by way of illustration various manners in which the invention may be practiced. It is to be understood that other embodiments may be utilized, as structural and operational changes may be made without departing from the scope of the present invention.

In general terms, the present invention provides a method and system for predicting the error of a behavior value forecast. In many applications, forecasts are used to predict some behavior of interest, such as total monthly revenue. What is not always provided is a reliable measure of the forecast's error. In order for a forecast to be relied upon for decision making, a reliable indicator of error should be provided. The error indicator should be presented to not only predict error of the forecast, but to indicate the validity of the error estimate itself. Using concepts of the present invention, the accuracy of a given forecast can be determined in a systematic way. Further, a confidence interval of the error can also be derived.

A confidence interval allows the boundaries of error for a given forecast to be determined to any desired level of certainty. The confidence interval is expressed as a range or magnitude of error that can be expected for a given level of statistical confidence. Therefore, predicting error to a 99 percent confidence level will generally provide a greater magnitude of error than a 95 percent confidence level, since the 99 percent case must factor in rarer instances of outlying data.

In a method according to the present invention, a series of historical data values are extracted and analyzed using the forecast analysis of interest. The variance between various poolings of historical forecasts and the actual target data can then be analyzed to derive a confidence interval for any data and forecast analysis method.

Figure 1:
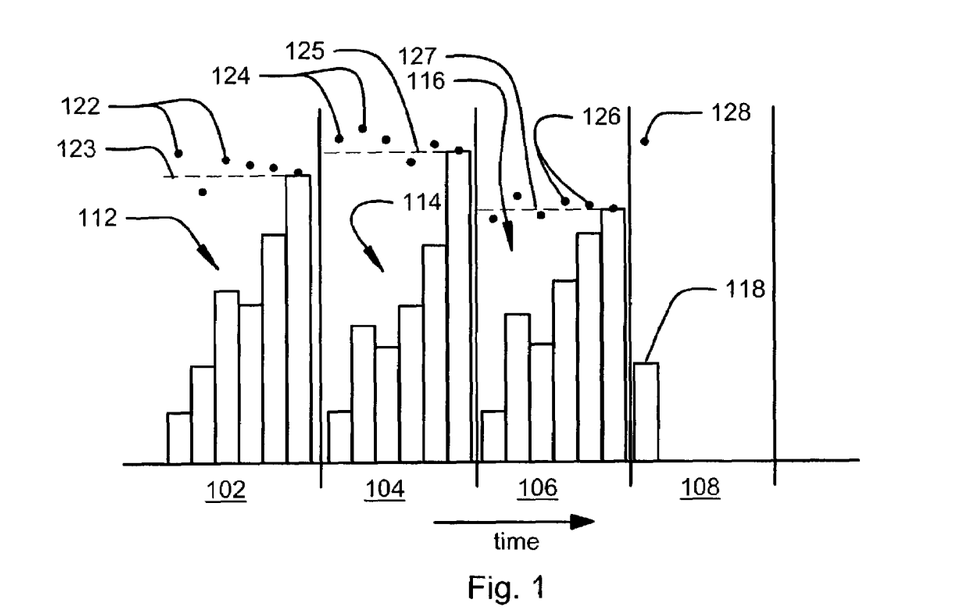
FIG. 1 is a timeline showing example point forecasts within current and historical time periods.

Turning now to FIG. 1, a timeline shows a series of behavior values over three historical periods 102, 104, and 106. Period 108 is the current, or forecast, period. Within each of the historical periods 102, 104, and 106 are bar graphs 112, 114, and 116, respectively, that represent behavior values extracted at discrete time points within the periods. The bar graphs 112, 114, and 116 can represent any behavior value of interest, including revenue, man-hours, sales, expenditures, labor-hour reporting, product demand, traffic patterns, network usage, etc.

Overlaid on the bar graphs 112, 114, and 116 are forecast points 122, 124, and 126, respectively, that are calculated to predict target behavior values 123, 125, and 127 within each period. In this example, the target behavior values 123, 125, and 127 are the values at the last day of the period, such as end-of-month cumulative revenue. Calculating point forecasts is a common task in data prediction, although describing concepts of the present invention in terms of point forecasts is for purposes of illustration and not of limitation. It is appreciated that any behavior value such as trends or rates of change can be forecasted and analyzed using concepts of the present invention.

The forecast points 122, 124, and 126 can be found using any form of behavior prediction algorithm, such as the Autoregressive Integrated Moving Average (ARIMA). The forecast points 122, 124, and 126 can be obtained from real-time predictions and stored in a historical database. Alternatively, historical data can be extracted and the prediction algorithm run on the extracted data to derive the points 122, 124, and 126. This latter method is useful when applying a new prediction algorithm that has compiled no historical record of predictions. The forecast points within each of the historical periods 102, 104, and 106 form a forecast series, as each forecast value is associated with a discrete time point within the period.

On the right side of the timeline in FIG. 1, the current forecast period 108 includes a current behavior value 118 and a forecast value 128. The forecast value 128 is used to predict the target behavior of interest for the remainder of the forecast period 108.

Figure 2:
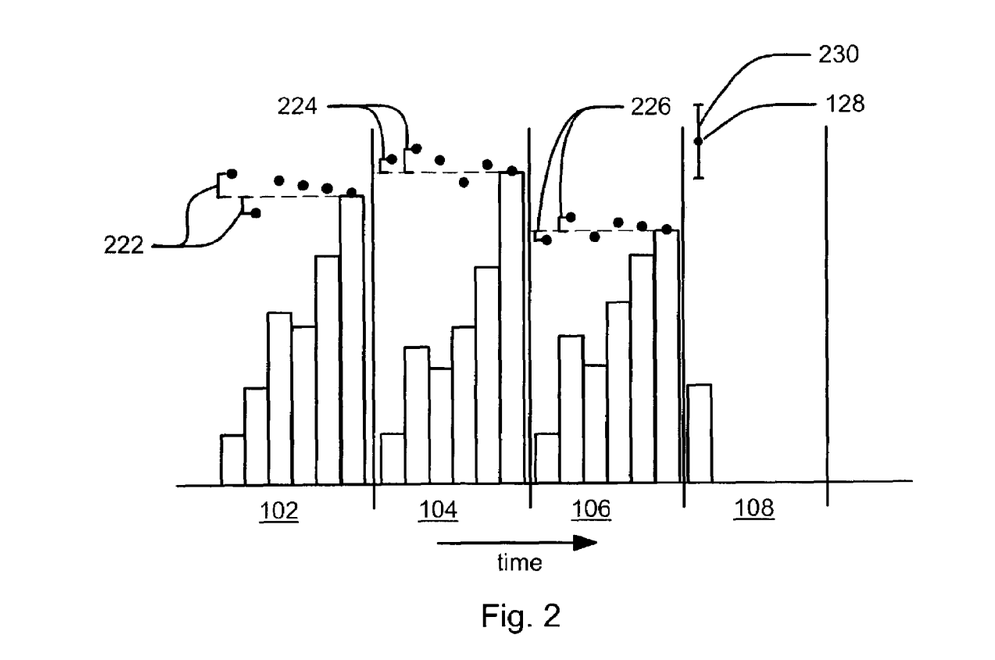
FIG. 2 is a timeline showing forecast errors calculated for the forecasts of FIG. 1.

In reference now to FIG. 2, an object of the present invention is to determine a forecast error estimate 230 for the current forecast value 128. Also shown in FIG. 2 are examples of forecast errors 222, 224, and 226 (shown here as a simple deviation between actual and forecast) associated with forecast points 122, 124, and 126 seen in FIG. 1. The forecast errors 222, 224, and 226 are calculated at discrete time points as a function of the target values 123, 125, and 127 and the forecast points 122, 124, and 126. The forecast errors within each of the historical periods 102, 104, and 106 thereby form a forecast error series, as each error value is associated with a discrete time point within the period.

The values of the forecast errors 222, 224, and 226 can be calculated by various methods known in the art. For example, the forecast error at each time point can be expressed as the difference between the forecasted and actual (target) value divided by the actual value (error=(actual-forecast)/actual).

In a method according to the present invention, the estimated forecast error 230 is found based on previous error values such as the forecast errors 222, 224, and 226. The estimated forecast error 230 is used to predict an error bounds on a current forecast value to provide user with an indication of forecast accuracy. Providing forecast accuracy assists in gauging the effectiveness of the forecast, as well as providing upper and lower bounds of the forecast for best-case/worst-case planning.

Figure 3:
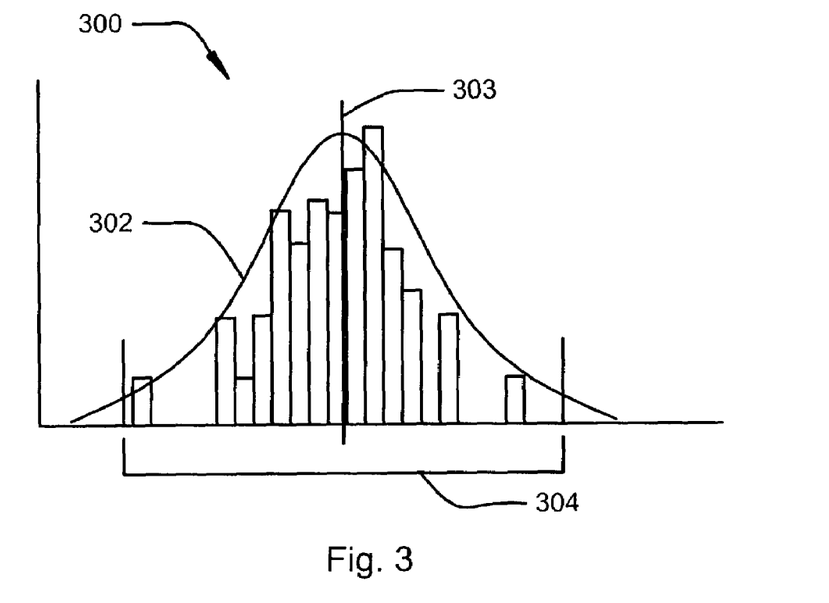
FIG. 3 is an example statistical distribution of pooled forecast errors that are associated over a plurality of historical periods.

The current error estimate 230 is formed by performing a statistical analysis of forecast errors at associated points within each of the historical periods 102, 104, and 106. In FIG. 3, a histogram 300 shows pooled forecast errors taken from associated forecast error points across a number of historical periods. The histogram of FIG. 3 assumes the error forms a Gaussian distribution 302, although other parametric or non-parametric statistical distributions may also be appropriate when characterizing pooled error data.

The associated forecast errors can be aggregated across or within historical periods using any method appropriate for the analysis. For example, if the historical periods are weekly, a pooling of forecast errors for each day of the week could be combined. In such an example, the histogram 300 could represent the forecast errors for the ith day of the week over the last j weeks. Also, adjacent days (day i−1 and day i+1, for example) could be pooled together to provide further statistical input for day i. A distribution such as that seen in FIG. 3 would be constructed for each day of the week, so that for any given day of the week, a forecasted error could be estimated. This collection of distributions would form an error distribution series for the week.

Referring again to FIG. 3, an error estimate 303 is derived from the error distribution 302. A forecasting error can be estimated from pooled data using any statistical inference known in the art. The error estimate 303 could be obtained by finding an average, a median, a weighted average, etc. Other statistical properties of the pooled error data such as the standard deviation may be used to provide bounds for the estimated forecast error for any given confidence level. The pooled error data is also used in selecting the proper error probability distribution.

In general, a confidence interval of error 304 is obtained for the distribution 302 and is associated with a desired confidence level. In theory, the distribution 302 extends asymptotically to zero in both left and right directions, and therefore has an infinite range. However, using statistical analyses known in the art, the confidence interval 304 can be selected to represent the probable upper and lower bounds of error for a given confidence level.

The confidence interval 304 can be symmetric or asymmetric about the origin (the center of the distribution 302 may or may not be the origin) and depends on the mean value relative to the standard deviation of the error distribution 302. If the mean is small compared to the standard deviation, any non-symmetric bias can be ignored and a symmetric interval constructed. A standard t-test can be used to determine whether the bias can be ignored. If the bias cannot be ignored, there are ways of correcting for it. One method involves estimating the bias and subtracting it from the upper and lower bounds of the original confidence interval for the error. The result is an asymmetric confidence interval for the error.

Figure 4:
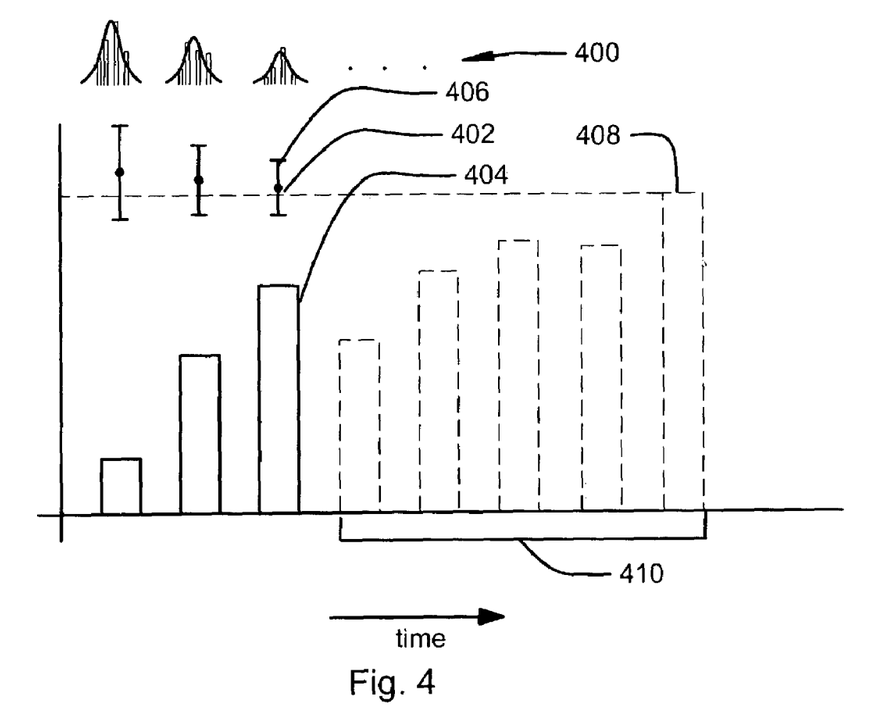
FIG. 4 is an example timeline showing a current time period with a forecast value and an associated forecast error.

FIG. 4 shows a forecast graph illustrating use of the estimated forecast errors. Assume the forecast value of interest in the period is the point 408 at the end of the period. An error distribution series 400 associated with the period has been determined from pooled forecast data of preceding historical periods. A forecast 402 is found using a forecasting algorithm applied to the current behavior value 404. A confidence interval 406 of the forecast is determined from the error distribution series 400 and is used to place an error boundary on the forecast 402. As time goes by, more behavior data 410 are observed. The updated behavior data 410, the forecasting algorithm, and the error distribution series 400 are used to provide continuously updated point forecasts and error intervals for all intervening time points up to the end of period.

Figure 5:
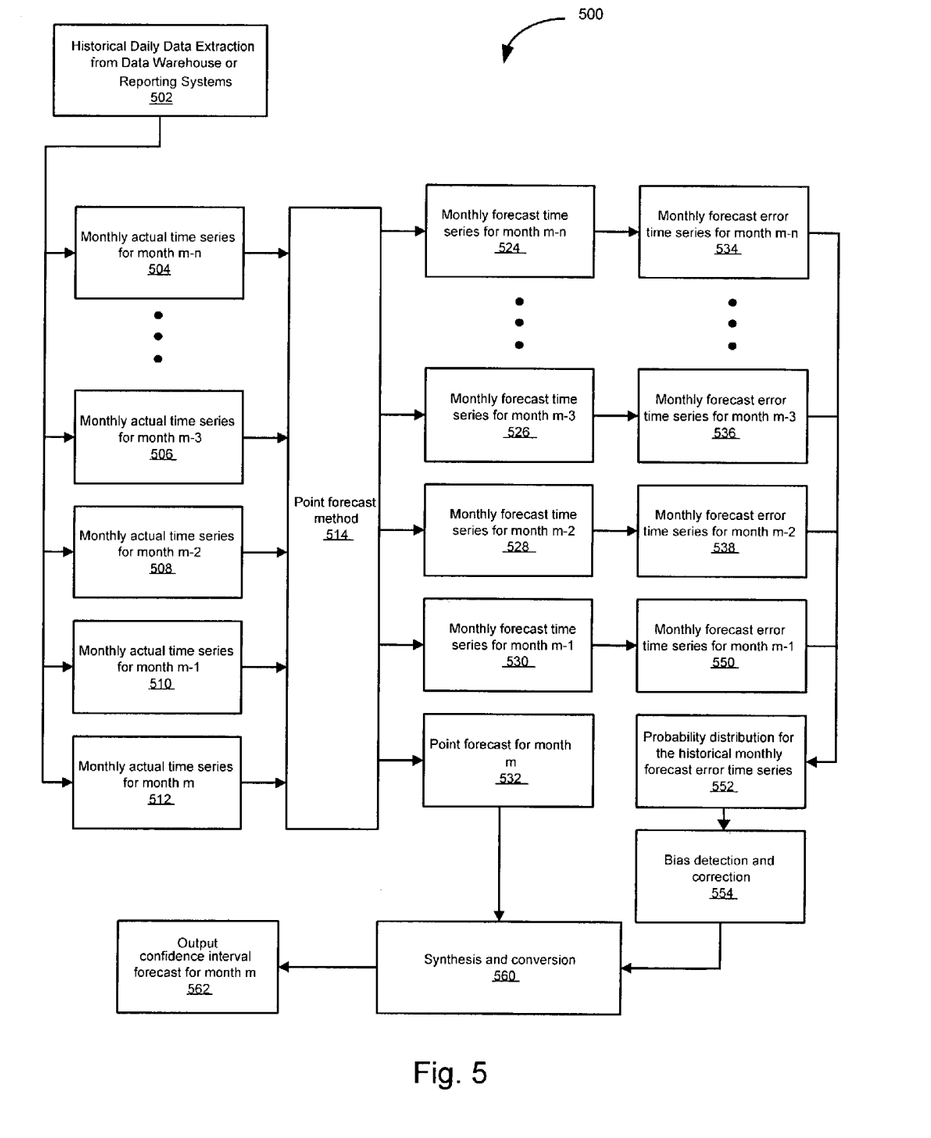
FIG. 5 is a flowchart showing derivation of forecast errors and confidence intervals in accordance with the various embodiments of the present invention.

FIG. 5 is a flowchart 500 showing the steps used in a method according to the present invention. For purposes of illustration, the historical data used in the flowchart 500 is assumed to be based on monthly historical periods. It is appreciated, however, that the concepts illustrated in the flowchart 500 are applicable to any appropriate historical time period.

First, the historical data is extracted 502 from a data warehouse or reporting system. The extracted data is assumed to cover a period of n months, not counting the current month. The most current month for purposes of FIG. 5 is assumed to be month m. Therefore, the oldest month of the historical data period extracted is month (m−n).

At 504, the behavior time series for month (m−n) is determined. The behavior time series determination 504 may include parsing extracted data, or may involve other operations such as calculating cumulative sums or data conditioning. The determination 504 may also involve determining the target value of interest for the month.

The determination of monthly data continues for all months up to month m, as shown in 506, 508, 510, and 512. These determination 506, 508, 510, and 512 may occur in parallel with 504 or in series. After all monthly data has been determined, the point forecast method is applied 514 to forecast the target value for each discrete time point (e.g. day) of the month. Applying the point forecast 514 generates a set of forecast series 524, 526, 528, 530 for the range of months (m−n) to (m−1). Note that since month m is the current month and not a historical month, there may not be a complete forecast series generated. Instead, the forecast values from the beginning of the period through the most current time point in month m are calculated 532.

After each forecast time series is generated 524, 526, 528, 530, the series are compared to the target (actual) behavior values. This comparison generates a monthly forecast error series 534, 536, 538, 550 for the range of months (m−n) to (m−1). Generating the monthly forecast error series 534, 536, 538, 550 includes determining a forecast error for each discrete time point within the month.

The associated error values across all the error time series 534, 536, 538, 550 for the range of months (m−n) to (m−1) are pooled into a series of error distributions 552. This pooling 552 may involve collecting error values from associated days of the month (e.g. day 1 of all months, day 2 of all months, etc) into distributions as well as pooling adjacent error values (e.g. day 1 and day 2 of same month). The pooled errors are checked and corrected for bias 554. This may involve determining the type of distribution to use and whether to include asymmetric or symmetric intervals.

The error distributions found at 554 are synthesized 560 with the forecast value found at 532. Synthesis 560 involves finding the probability distribution from the error distribution series 552 associated with the current day of the month. The associated probability distribution is used to make statistical inferences for the current prediction to any desired confidence level. Synthesis 560 may also involve converting the confidence interval for the error to the metric to be forecast (e.g. total monthly revenue).

Once a forecast and confidence interval have been synthesized 560, they can be output 562 for use. The forecast and confidence interval output 562 may include providing a programmatic interface such as an application program interface (API) or a web service. The output can be available as binary data or in a human readable format such as text, graphics, Hypertext Markup Language (HTML), Extensible Markup Language (XML), etc. The output can be provided on a single computing system or published on a network.

Figure 6:
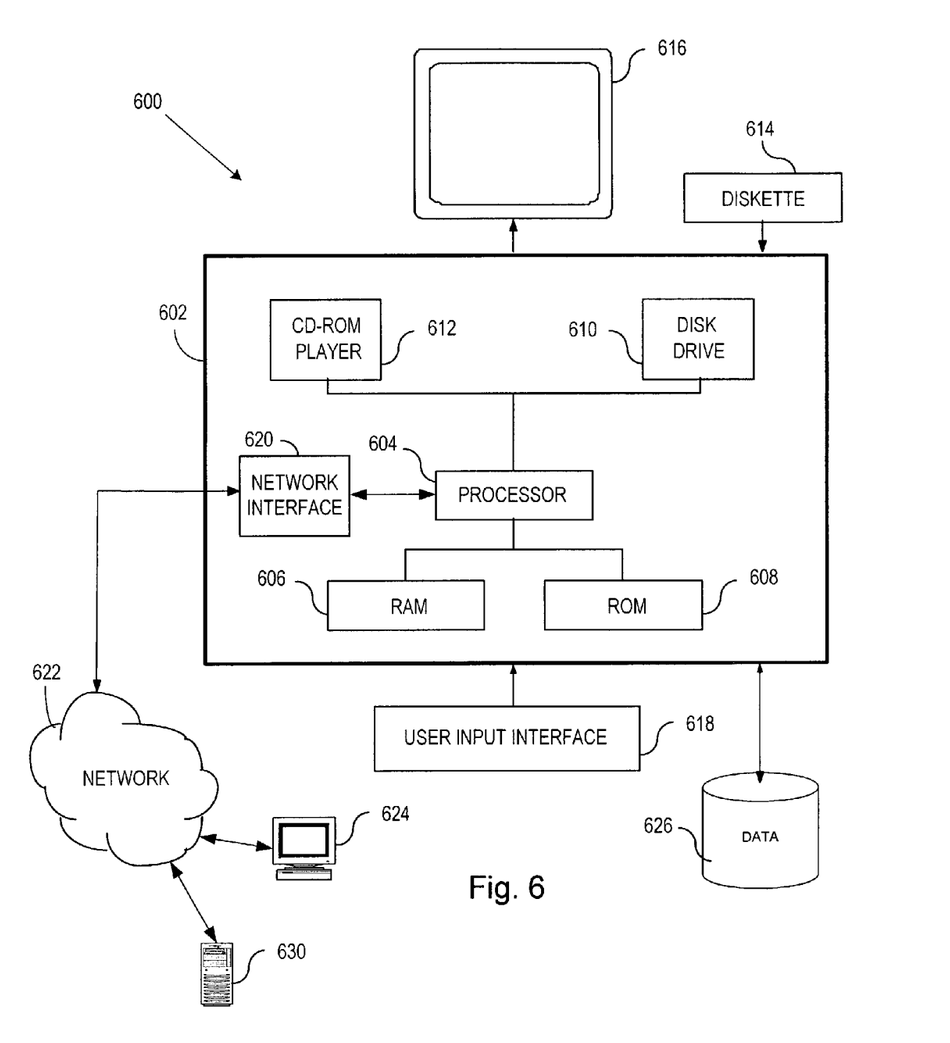
FIG. 6 is a diagram of an example computing apparatus embodying forecasting and interval predication in accordance with various embodiments of the present invention.

FIG. 6 shows a data processing system 600 utilizing concepts of the present invention. The system 600 includes a computing apparatus 602 with a processor 604 coupled to some form of data storage for storing current and historical behavior data. The data storage may include volatile memory such as random access memory (RAM) 606. Other devices that the apparatus 602 may use for data storage and retrieval include a read-only memory (ROM) 608, disk drive 610, compact disk ROM (CD-ROM) 612, and diskette 614. A display 616 and user input interface 618 are attached to the computing apparatus 602 to allow data input and display. The computing apparatus 602 includes a network interface 620 that allows the apparatus to communicate with other computing devices 624 across a network 622.

In one embodiment of the invention, the computing apparatus 602 extracts historical data (e.g. as described at 502 of FIG. 5) from a database 626 or some other data storage device. The computing apparatus uses the processor 604 and memory 606 to calculate the historical and current forecasts and error values in accordance with the methods described in relation to FIG. 5. The resultant data may shown on the display 612, stored to persistent storage 610, 612, 614, or published over the network 622.

In one arrangement, the forecast and confidence interval are calculated at regular intervals and provided as a web service using hypertext transfer protocol (HTTP) to other computing devices over the network. The HTTP server can run on the computing apparatus 602 or on another server 630.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of the example embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer-implemented method for determining a confidence interval for a forecasted behavior value associated with a current time point, the method comprising:

defining, by a computer, a plurality of historical periods each having a plurality of discrete time points;

determining, by the computer, a target behavior value for each historical period;

generating, by the computer, a forecast series for each historical period, the forecast series including forecasts of the target behavior value at the discrete time points of the historical period;

generating, by the computer, a forecast error series for each historical period as a function of the forecast series and the target behavior value of the historical period;

forming, by the computer, an error distribution series from pooled values of the forecast error series over the plurality of historical periods;

generating, by the computer, a forecast error distribution as a function of the error distribution series and the current time point;

determining, by the computer, the confidence interval of the forecasted behavior value from the forecast error distribution.

2. The method of claim 1, wherein the target behavior values and the forecasted behavior value comprise revenue values.

3. The method of claim 1, wherein the target behavior values each comprise an end-of-period cumulative sum of behavior values of the corresponding historical period.

4. The method of claim 1, wherein forming an error distribution series further comprises fitting a parametric probability distribution on pooled values of the forecast error series.

5. The method of claim 1, wherein forming an error distribution series further comprises fitting a Gaussian distribution on pooled values of the forecast error series.

6. The method of claim 1, wherein forming an error distribution series further comprises fitting a non-parametric probability distribution on pooled values of the forecast error series.

7. The method of claim 1, wherein forming an error distribution series further comprises determining an asymmetric bias on pooled values of the forecast error series and adjusting the error distribution series to account for the asymmetric bias.

8. The method of claim 1, wherein the historical periods comprise monthly periods and the discrete time points of the historical periods comprise daily points.

9. The method of claim 1, wherein forming an error distribution series further comprises calculating an average of the pooled values of the forecast error series.

10. The method of claim 1, wherein forming an error distribution series further comprises calculating a median of the pooled values of the forecast error series.

11. The method of claim 1, wherein forming an error distribution series further comprises calculating a standard deviation of the pooled values of the forecast error series.

12. The method of claim 1, wherein forming an error distribution series further comprises pooling values of the forecast error series having associated discrete time points over the plurality of historical periods.

13. The method of claim 1, wherein forming an error distribution series further comprises pooling adjacent values of the forecast error series within each of the plurality of historical periods.

14. The method of claim 1, further comprising publishing the confidence interval as a web services.

15. A data processing system for determining a confidence interval for a forecasted behavior value, comprising:
  a storage to store values in a plurality of series associated with a respective plurality of historical periods; and
  a processor to:
    determine a target behavior value for each of the plurality of historical periods, each historical period having a plurality of discrete time points;
    perform steps (a)-(b) for each of the historical periods,
      (a) generate a forecast of the target behavior value at each discrete time point of the historical period; and
      (b) generate a forecast error series as a function of the target behavior value and the forecast at each discrete time point;
    form an error distribution series by pooling values of the forecast error series over the plurality of historical periods; and
    determine the confidence interval from an error distribution of the error distribution series, the error distribution associated with the forecasted target behavior value.

16. The data processing system of claim 15, wherein the target behavior values and the forecasted behavior value comprise revenue values.

17. The data processing system of claim 15, wherein the target behavior values each comprise an end-of-period cumulative sum of behavior values of the historical period.

18. The data processing system of claim 15, wherein forming the error distribution series comprises fitting a parametric probability distribution on pooled values of the forecast error series.

19. The data processing system of claim 15, wherein forming the error distribution series further comprises fitting a Gaussian distribution on pooled values of the forecast error series.

20. The data processing system of claim 15, wherein forming the error distribution series comprises fitting a non-parametric probability distribution on pooled values of the forecast error series.

21. The data processing system of claim 15, wherein forming the error distribution series comprises determining an asymmetric bias on pooled values of the forecast error series and adjusting the error distribution series to account for the asymmetric bias.

22. The data processing system of claim 15, wherein the historical periods comprise monthly periods and the discrete time points of the historical periods comprise daily points.

23. The data processing system of claim 15, wherein forming the error distribution series comprises calculating an average value of the pooled values of the forecast error series.

24. The data processing system of claim 15, wherein forming the error distribution series comprises calculating a median value of the pooled values of the forecast error series.

25. The data processing system of claim 15, wherein forming the error distribution series comprises calculating a standard deviation value of the pooled values of the forecast error series.

26. The data processing system of claim 15, wherein forming the error distribution series comprises pooling values of the forecast error series having associated discrete time points over the plurality of historical periods.

27. The data processing system of claim 15, wherein forming the error distribution series comprises pooling adjacent values of the forecast error series within each of the plurality of historical periods.

28. The data processing system of claim 15, wherein the processor is to further publish the confidence interval as a web service.

29. An article of manufacture for determining a confidence interval for a forecasted behavior value associated with a current time point, comprising: a computer-readable medium configured with instructions that when executed by a computer perform, defining a plurality of historical periods each having a plurality of discrete time points;

determining a target behavior value for each historical period;

generating a forecast series for each historical period, the forecast series including forecasts of the target behavior value at the discrete time points of the historical period;

generating a forecast error series for each historical period as a function of the forecast series and the target behavior value of the historical period;

forming an error distribution series from pooled values of the forecast error series over the plurality of historical periods;

generating a forecast error distribution as a function of the error distribution series and the current time point;

determining the confidence interval of the forecasted behavior value from the forecast error distribution.

30. The article of manufacture of claim 29, wherein the target behavior values and the forecasted behavior value comprise revenue values.

31. The article of manufacture of claim 29, wherein the target behavior values each comprise an end-of-period cumulative sum of behavior values of the historical period.

32. The article of manufacture of claim 29, wherein forming an error distribution series further comprises fitting a parametric probability distribution on pooled values of the forecast error series.

33. The article of manufacture of claim 29, wherein forming an error distribution series further comprises fitting a Gaussian distribution on pooled values of the forecast error series.

34. The article of manufacture of claim 29, wherein forming an error distribution series further comprises fitting a non-parametric probability distribution on pooled values of the forecast error series.

35. The article of manufacture of claim 29, wherein forming an error distribution series further comprises determining an asymmetric bias on pooled values of the forecast error series and adjusting the error distribution series to account for the asymmetric bias.

36. The article of manufacture of claim 29, wherein the historical periods comprise monthly periods and the discrete time points of the historical periods comprise daily points.

37. The article of manufacture of claim 29, wherein forming an error distribution series further comprises calculating an average value of the pooled values of the forecast error series.

38. The article of manufacture of claim 29, wherein forming an error distribution series further comprises calculating a median value of the pooled values of the forecast error series.

39. The article of manufacture of claim 29, wherein forming an error distribution series further comprises calculating a standard deviation value of the pooled values of the forecast error series.

40. The article of manufacture of claim 29, wherein forming an error distribution series further comprises pooling values of the forecast error series having associated discrete time points over the plurality of historical periods.

41. The article of manufacture of claim 29, wherein forming an error distribution series further comprises pooling adjacent values of the forecast error series within each of the plurality of historical periods.

42. The article of manufacture of claim 29, further comprising publishing the confidence interval as a web service.

\* \* \* \* \*

UNITED STATES PATENT AND TRADEMARK OFFICE
CERTIFICATE OF CORRECTION

| | | |
|---|---|---|
| PATENT NO. | : 7,587,330 B1 | Page 1 of 1 |
| APPLICATION NO. | : 10/355353 | |
| DATED | : September 8, 2009 | |
| INVENTOR(S) | : Jerry Shan | |

It is certified that error appears in the above-identified patent and that said Letters Patent is hereby corrected as shown below:

In column 7, line 59, in Claim 14, delete "services." and insert -- service. --, therefor.

Signed and Sealed this

Twentieth Day of April, 2010

David J. Kappos
*Director of the United States Patent and Trademark Office*